United States Patent [19]
Vallinotto et al.

[11] 3,847,331
[45] Nov. 12, 1974

[54] CLAMP DEVICE, ADAPTED TO BE ASSEMBLED IN SEQUENCE, FOR SUPPORTING AND RETAINING PIPES, CABLES AND THE LIKE

[76] Inventors: Michele Vallinotto, Strada San Michele 29, Testona-Moncalieri; Luigi Villata, Via Stazione 6bis, Moncalieri, both of Italy

[22] Filed: Oct. 30, 1972

[21] Appl. No.: 301,834

[52] U.S. Cl. ............ 248/74 PB, 24/83, 24/201 HE, 248/68 R, 403/386
[51] Int. Cl. ............................................. F16l 3/12
[58] Field of Search .. 248/74 R, 74 A, 74 B, 74 PB, 248/68 R, 68 CB, 73, 71, 62, 65; 287/189.36 H, 64; 24/83, 81 CC, 201 HE; 403/386, 398

[56] References Cited
UNITED STATES PATENTS

| | | | |
|---|---|---|---|
| 1,137,069 | 4/1915 | McIntyre | 248/68 R |
| 2,972,460 | 2/1961 | Kenyon | 248/68 R X |
| 3,186,051 | 6/1965 | Waddell | 248/68 CB X |
| 3,188,030 | 6/1965 | Fischer | 248/68 CB |
| 3,261,066 | 7/1966 | Chamberlin | 24/201 HE |
| 3,429,985 | 2/1969 | Czigler | 248/74 PB X |
| 3,432,129 | 3/1969 | Santucci | 24/81 CC X |
| 3,513,508 | 5/1970 | Modeme | 248/74 PB X |
| 3,516,631 | 6/1920 | Santucci | 248/74 PB X |
| 3,529,795 | 9/1970 | Van Niel | 248/74 PB X |
| 3,637,177 | 1/1972 | Santucci | 248/74 PB |

FOREIGN PATENTS OR APPLICATIONS

| | | | |
|---|---|---|---|
| 681,913 | 8/1938 | Germany | 248/74 R |
| 897,026 | 11/1953 | Germany | 248/68 R |

*Primary Examiner*—Roy D. Frazier
*Assistant Examiner*—Rodney H. Bonck

[57] ABSTRACT

A clamping device for supporting and retaining pipes, cables and the like which comprises: an elongated base with a hole for the passage of a retainer; a deformable clamp which extends from a rigid, arc-shaped foot with teeth for engagement to corresponding teeth carried by a finger on the said clamp; and a counter-element located in front of the teeth of said foot to define a cavity for prevention of radial displacement of the said finger.

1 Claim, 7 Drawing Figures

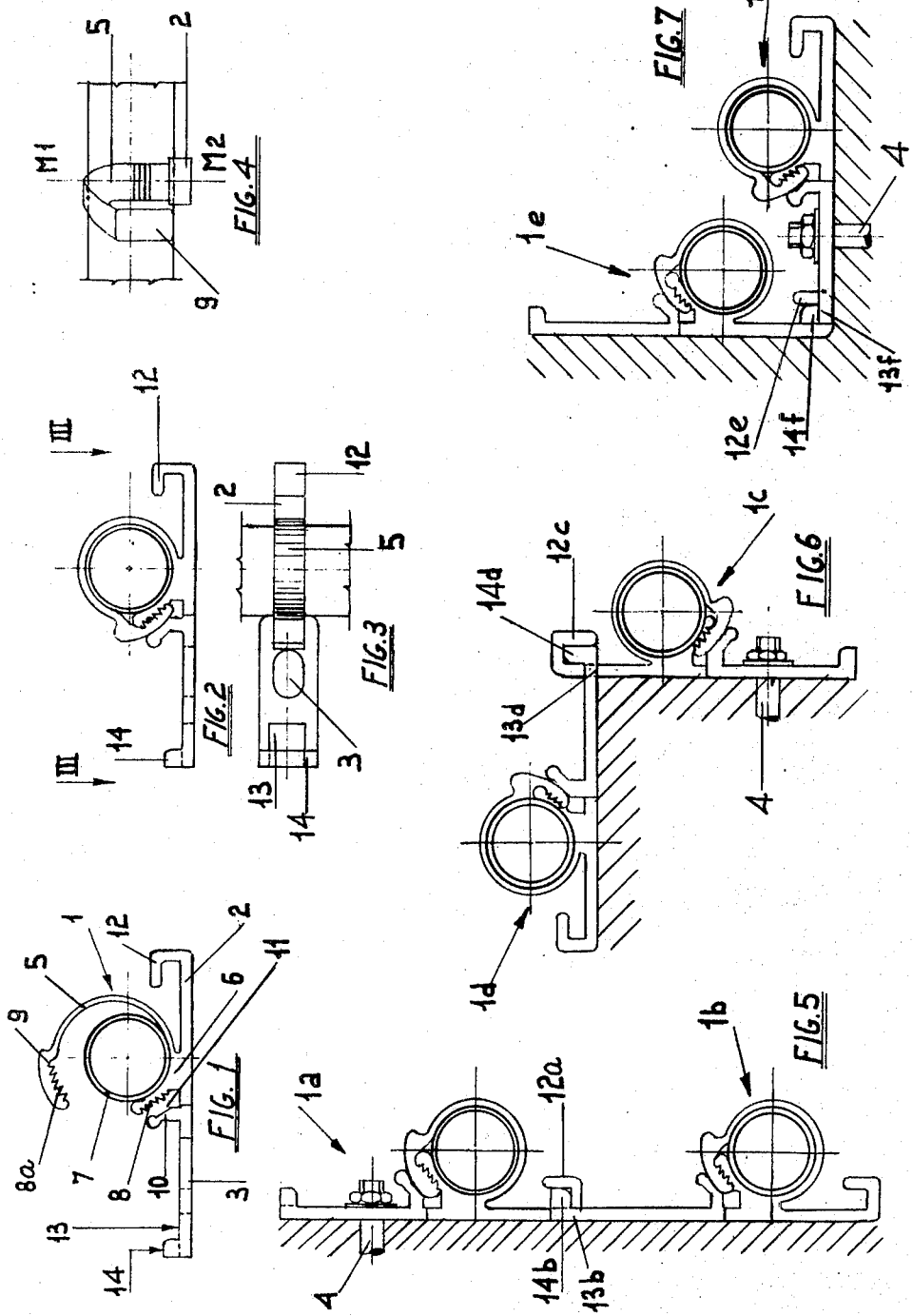

CLAMP DEVICE, ADAPTED TO BE ASSEMBLED IN SEQUENCE, FOR SUPPORTING AND RETAINING PIPES, CABLES AND THE LIKE

The present invention relates to a clamp device for supporting and retaining pipes, cables and the like, particularly suited for retaining the sheating and insulating pipes of electric conductors or leads in the public and industrial electric installations in place of the known retaining means employing metal clamps or riveted joints.

The principal object of the present invention is to provide a device of the kind referred to, which is of easy and rapid installation and such as to ensure maximum reliability, concerning both the retaining action and the avoidance of any damage to the aforementioned pipes or cables.

Another object of the invention is to provide a device adapted for use for retaining and supporting even pipes and cables of much different diameters, without requiring any adapter.

A further object of the present invention is to provide a device which enables immediate removal of the installed pipes or cables, permitting subsequent installations without requiring replacement of the same.

Still another important object of the present invention is to provide a device adapted to be assembled in succession, to form a continuous sequence of supports, thereby permitting the subsequent installation of further pipes or line conductors without requiring additional works, which would be otherwise necessary, such as the application of studs, pins or similar retaining means.

A further object of the invention is to provide a device of the kind referred to, which can be obtained with simplified and continuous processing method and, therefore, of low cost and convenient installation.

In order to attain these and other objects, which will become apparent from the following detailed description, the present invention provides a clamp device whose essential features resides in the fact that it comprises an elongated base having an aperture or hole for the passage of retaining means and, integral with said base, a deformable clamp which extends from a rigid or stiff foot having the profile of an arc of a circle which is provided outwardly with a series of teeth adapted to engage a corresponding series of teeth carried by a stiff finger at the end of said clamp, a counter-element being disposed in front of the series of teeth of said rigid foot in order to define a cavity or recess adapted to prevent any radial displacement of the finger of said clamp, which can be disengaged from the teeth only by means of a lateral oscillation. Further, in accordance with the invention, the aforementioned elongated base is provided with a hook at one end and, at the opposite end, with a perforated seat for housing the hook of the base of a similar adjacent device, so as to permit assembling of a plurality of such devices.

For a better understanding of the present invention, one particular embodiment thereof will now be described, merely by way of non-limiting example, with reference to the accompanying drawings, wherein:

FIG. 1 is an elevation view of a device according to the invention, with the clamp in its opened position for the installation of a pipe or cable, or of a cylindrical element in general;

FIG. 2 is an elevation view, similar to the preceding figure, but illustrating the device with the clamp in its closed position;

FIG. 3 is a top plan view taken along the lines III—III of FIG. 2;

FIG. 4 is a front elevation view of the device, illustrating in detail the modalities of disengagement of the clamp from the teeth of the base foot of the same;

FIG. 5 is an elevation view illustrating the assembling of two devices according to the invention, disposed in rectilinear or straight succession;

FIG. 6 is an elevation view illustrating the assembling of two devices of the invention disposed at right angles to one another, and FIG. 7 is a view similar to that of the preceding figure, but illustrating a different arrangement of the aforementioned devices at right angles to one another.

In the drawings, the device of the invention is generally indicated at 1. It comprises an elongated base 2 with a hole 3 for allowing passage of retaining means, constituted for instance by a bolt 4. The base 2 further comprises, integrally formed therewith, a deformable clamp 5 which extends from a rigid foot 6; said base and clamp being both made of plastic material, preferably of thermoplastic material. The foot 6 has the profile of an arc of a circle which merges smoothly with the clamp 5 to form the seat for receiving the pipe or cable indicated at 7. It is further provided outwardly with a toothing 8 of the sawtooth type which cooperates, with mutual interengagement, with a corresponding series of teeth $8_a$ carried by a stiff finger 9 at the end of the clamp 5. The base 2 is further provided with an extension or counter-element 10, facing towards the series of teeth 8 of the rigid foot, so as to define a recess 11 intended for containing the finger 9 in order to prevent radial displacements which would produce the disengagement of the teeth 8 from the teeth 8a.

Said finger will be introduced in the aforementioned recess with a snap action and removed therefrom by urging the clamp laterally in order to bring the same out of the longitudinal central plane $M_1$–$M_2$ of said device, as illustrated in FIG. 4. Furthermore, as will be apparent from the drawings, the interengagement of the series of teeth of the finger 9 with those of the foot 6 will take place for a suitable length, however variable in relation to the diameter of the cylindrical element, i.e. the pipe or cable 7.

The base 2 of each device is further provided, at one extremity, with a tab having the shape of a hook, indicated at 12 and, at its opposite extremity, with a perforated seat 13 delimited by a raised cross member 14, which can come into engagement with the hook 12 of another adjacent and similar device, so as to enable assembling of a plurality of such devices.

FIG. 5 shows in fact the assembling of two devices $1_a$ – $1_b$, disposed in a rectilinear sequence. As can be seen in this figure, the hook $12_a$ of the device $1_a$, by passing through the hole $13_b$ in the device $1_b$, will engage the cross member $14_b$ of the latter, thereby ensuring a stable connection between the two adjacent devices. The stability of this connection is such as to allow the use of a single locking bolt, such as 4, for a series consisting of a number of devices connected in succession what, on the one hand, will simplify the operations of installation and, on the other hand, will make possible, in accordance with the purposes of the invention, the installation of a number of subsequent devices in relation with the requirements of enlargement of already existing plants, without the need of employing locking means, such as bolts, riveted joints and the like.

FIG. 6 illustrates the combination of two devices $1_c - 1_d$ in angular succession, said devices being disposed, for instance, on the outer surface of a support at right angles, such as a corner formed by two walls. In this instance, too, it can be seen that the hook $12_c$ of the device $1_c$, by passing through the seat $13_d$ of the device $1_d$, will engage the cross member $14_d$ of the latter in a stable manner, thereby ensuring a firm connection of the two devices with one another, whilst only one of these will be locked to the support by means of a bolt, such as the bolt 4.

Finally, FIG. 7 illustrates a further angular arrangement, wherein two devices $1_e - 1_f$ are installed inside a support forming an angle of 90°, for instance a corner formed by two walls. In this case, too, it can be seen that the hook $12_e$ of the device $1_e$, by passing through the hole $13_f$ of the device $1_f$, will engage the cross member $14_f$ of the same, thereby establishing the connection desired, only one of said devices being anchored by means of a bolt 4.

It is to be understood that the above description is merely illustrative of a particular embodiment of the present invention given by way of non-limiting example and that many modifications and variations can be introduced both in the shape and the arrangement of the various parts and components, without departing from the scope of the invention.

What we claim is:

1. A thermal plastic clamping device adapted to be assembled in sequence for supporting and retaining pipes, cables and the like, said clamping device comprising, in combination, an elongated base; an aperture in said base for receiving a fastener therethrough whereby said base may be mounted on a support surface; an arcuate, rigid foot integral with said base, said foot having teeth thereon; a deformable clamp integral with said foot and extending from said foot in an arcuate manner for engaging the pipe; a rigid finger-like terminal on said clamp having teeth thereon that are adapted to engage the teeth of said foot; and a counter-element on said base disposed in front of said teeth of said rigid foot for defining a cavity adapted to retain said finger therein, the teeth of said finger being disengageable from the teeth of said foot only by means of a lateral displacement of said finger, said elongated base including an L-shaped hook at one end of said base and having a first member extending perpendicular to said base and a second member extending parallel to said base and a seat formed at the opposite end of said base by a recess extending inwardly of said end and a raised cross member on said opposite end and extending across said end and partially over said recess for receiving the L-shaped hook of the base of a second adjacent clamping device whereby at least two adjacent ones of said clamping devices may be secured to each other in a common plane or either in internal or external angular planes.

* * * * *